(12) United States Patent
Deegan et al.

(10) Patent No.: US 8,684,023 B2
(45) Date of Patent: Apr. 1, 2014

(54) RODDABLE DIRECT MOUNT MANIFOLD FOR PRIMARY FLOW ELEMENT

(75) Inventors: Paul Timothy Deegan, Boulder, CO (US); Donald Robert Verhaagen, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 237 days.

(21) Appl. No.: 13/276,715

(22) Filed: Oct. 19, 2011

(65) Prior Publication Data

US 2013/0098469 A1   Apr. 25, 2013

(51) Int. Cl.
*F16K 5/22* (2006.01)

(52) U.S. Cl.
USPC ........... 137/244; 137/15.07; 137/884; 73/756

(58) Field of Classification Search
USPC ........... 137/15.01, 15.07, 242, 244, 861, 884; 73/861.61, 756, 861.42
See application file for complete search history.

(56) References Cited

U.S. PATENT DOCUMENTS

| | | | | |
|---|---|---|---|---|
| 4,672,728 A | * | 6/1987 | Nimberger | 29/890.142 |
| 4,879,912 A | | 11/1989 | Suckow | |
| 4,938,246 A | * | 7/1990 | Conley et al. | 137/15.07 |
| 5,036,711 A | | 8/1991 | Good | |
| 5,725,024 A | * | 3/1998 | Nimberger | 137/597 |
| 5,832,956 A | * | 11/1998 | Nimberger | 137/597 |
| 5,868,155 A | * | 2/1999 | Hutton | 137/240 |
| 6,000,427 A | | 12/1999 | Hutton | |
| 6,272,931 B1 | * | 8/2001 | Nimberger | 73/756 |
| 6,622,573 B2 | * | 9/2003 | Kleven | 73/861.42 |
| 8,028,720 B2 | | 10/2011 | Willeke et al. | |
| 2003/0188586 A1 | | 10/2003 | Orleskie et al. | |

FOREIGN PATENT DOCUMENTS

GB    2391278 A    2/2004
WO    2007068230 A1    6/2007

OTHER PUBLICATIONS

International Search Report and Written Opinion for PCT Application No. US/2012/060712, dated Mar. 1, 2013, 12 pages.

* cited by examiner

*Primary Examiner* — Craig Schneider
*Assistant Examiner* — Ian Paquette
(74) *Attorney, Agent, or Firm* — Westman, Champlin & Koehler, P.A.

(57) ABSTRACT

An apparatus and rodding method is disclosed for cleaning particulant matter from the interior high and low pressure fluid conducting conduits of a valve manifold and its mounting neck that are components of a process fluid flow or mass flow measuring assembly. High and low pressure fluid conducting conduits run through the longitudinal length of the manifold body with laterally extending diversion channels that conduct the high and low pressure fluid to a pressure transducer mounted on the back side of the valve manifold. Following shut down of the process fluid flow, plugs at the terminal end of the fluid channels are removed, permitting cleaning rods to be inserted into the fluid channels, without having to remove the pressure transducer and associated data transmitter from the assembly.

11 Claims, 5 Drawing Sheets

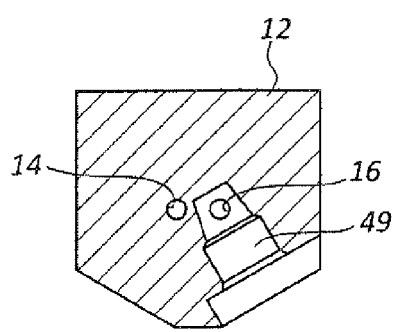
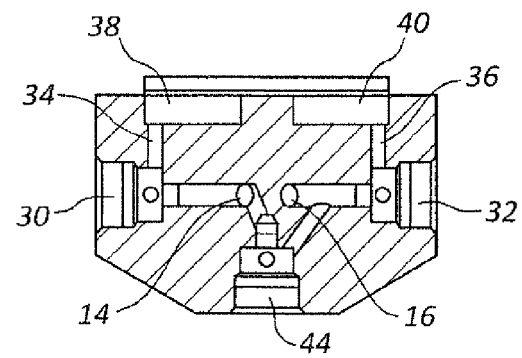
FIG. 8     FIG. 9
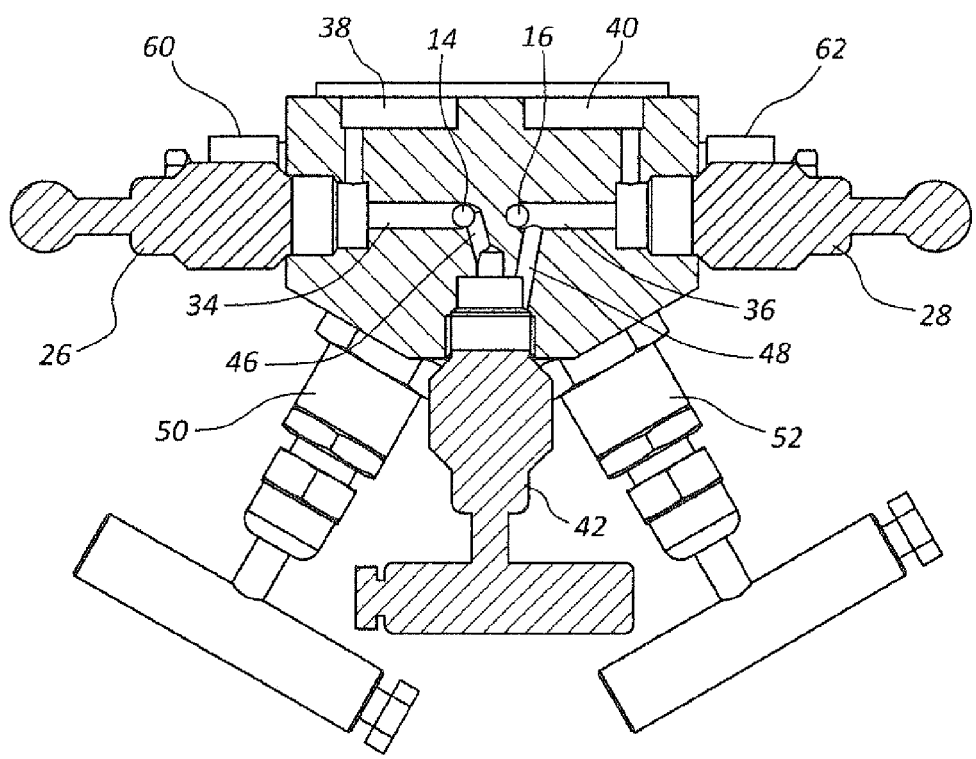
FIG. 9a

US 8,684,023 B2

RODDABLE DIRECT MOUNT MANIFOLD FOR PRIMARY FLOW ELEMENT

FIELD OF THE INVENTION

The present invention relates to the field of process flow measurement and more particularly to improvements in the construction of the valve manifold that interconnects the output of a differential pressure fluid flow meter with the flow data transmitter.

BACKGROUND OF THE INVENTION

The high and low pressure outputs of the primary flow element of a differential pressure fluid flow meter are traditionally conveyed through conduits to a pressure transducer whose electrical output is communicated to a instrumentation center by a transmitter. It is necessary, however, to occasionally conduct maintenance on or calibrate the transmitter. For this purpose there is inserted between the pressure conduits and the pressure transducer a valve manifold that allows the respective high and low pressure conduits to be closed in order to isolate the pressure transducer from the process flow or the high and low pressures existing in the manifold can be equalized by a single valve in the manifold in order to calibrate the transmitter. In process applications where the fluids contain particulate matter maintenance must be performed to cleanse deposits of the particulate matter from the internal passageways and portions of the primary flow element in order to maintain the integrity of the flow measuring apparatus. The cleaning process requires significant disassembly of the manifold and transmitter combination resulting in untimely delays in getting the system back on line.

Thus, it is the primary object of the present invention to provide a valve manifold for a process flow meter assembly whose internal passages can be cleansed of particulate matter through a rodding process that does not require disconnection of the pressure transducer and transmitter from the valve manifold and utilizes a rod inserted in the manifold passages to break down or remove obstructions and adherent material.

SUMMARY OF THE INVENTION

The multi-valve manifold of the present invention is one component of a process fluid flow, or mass flow, instrumentation assembly. The assembly comprises a primary flow element, such as a differential pressure self-averaging orifice plate, or a pitot tube, the valve manifold, a pressure transducer, a data transmitter and can include a fluid temperature sensor.

The valve manifold includes a body comprising high and low pressure fluid conducting roddable bores extending from the upper surface of the body to its bottom surface. Selectively removable pluggable ports at the terminal ends of the bores on the upper manifold body surface permit the insertion of abrasive rods to cleanse adhering particulant matter from the high and low pressure fluid conducting bores within the manifold body. Laterally extending fluid conduits communicate with the roddable bores and make fluid connection with the pressure transducer which is mounted proximate the upper surface, but on the rear side of the manifold body. Mounting the pressure transducer and interconnected data transmitter on the rear side of the body, instead of the traditional top side, permits the insertion of cleaning rods directly into the fluid conducting bores when the upper surface plugs are removed from the terminal ends of the bores. In addition to permitting a rodding process, this configuration is less subject to vibration than the traditional longitudinal mounting configuration shown for a similar process instrumentation assembly in U.S. Pat. No. 7,406,880. Located proximate the lower portion of the manifold body are high and low pressure block valves that are positioned and arranged to shut off the process fluid from entering the fluid conducting bores. The block valves are of the "through-port" type so that when conducting the rodding process the rods can freely pass though the distal ends of the block valves that are disposed in the fluid conducting bores. Proximate the upper portion of the manifold body are redundant high and low pressure shut-off valves and an equalizer valve, all in fluid communication with the high and low pressure fluid conducting bores, and which are primarily intended for use in reducing or equalizing process fluid pressure when calibrating the data transmitter.

Operation of the rodding process requires that the process fluid first be depressurized and the process fluid flow be shut down. This allows the block valves in the manifold to remain open, permitting the cleaning rods to be inserted through the distal ends of the block valves and well past the lower extremity of the manifold body, through the fluid conduits in the manifold mounting neck and into the primary flow element.

DESCRIPTION OF THE DRAWINGS

FIG. 8 is a cross sectional view of the body of the valve manifold taken along lines 8-8 of FIG. 4.

FIG. 9 is a cross sectional view of the body of the valve manifold taken along lines 9-9 of FIG. 4.

FIG. 9a is a cross sectional view of the body of the valve manifold taken along lines 9-9 of FIG. 4 and including exploded partial longitudinal cross sectional views of the valves that occupy of valve pockets shown in FIG. 9.

DETAILED DESCRIPTION OF PREFERRED EMBODIMENT

Figure 1:
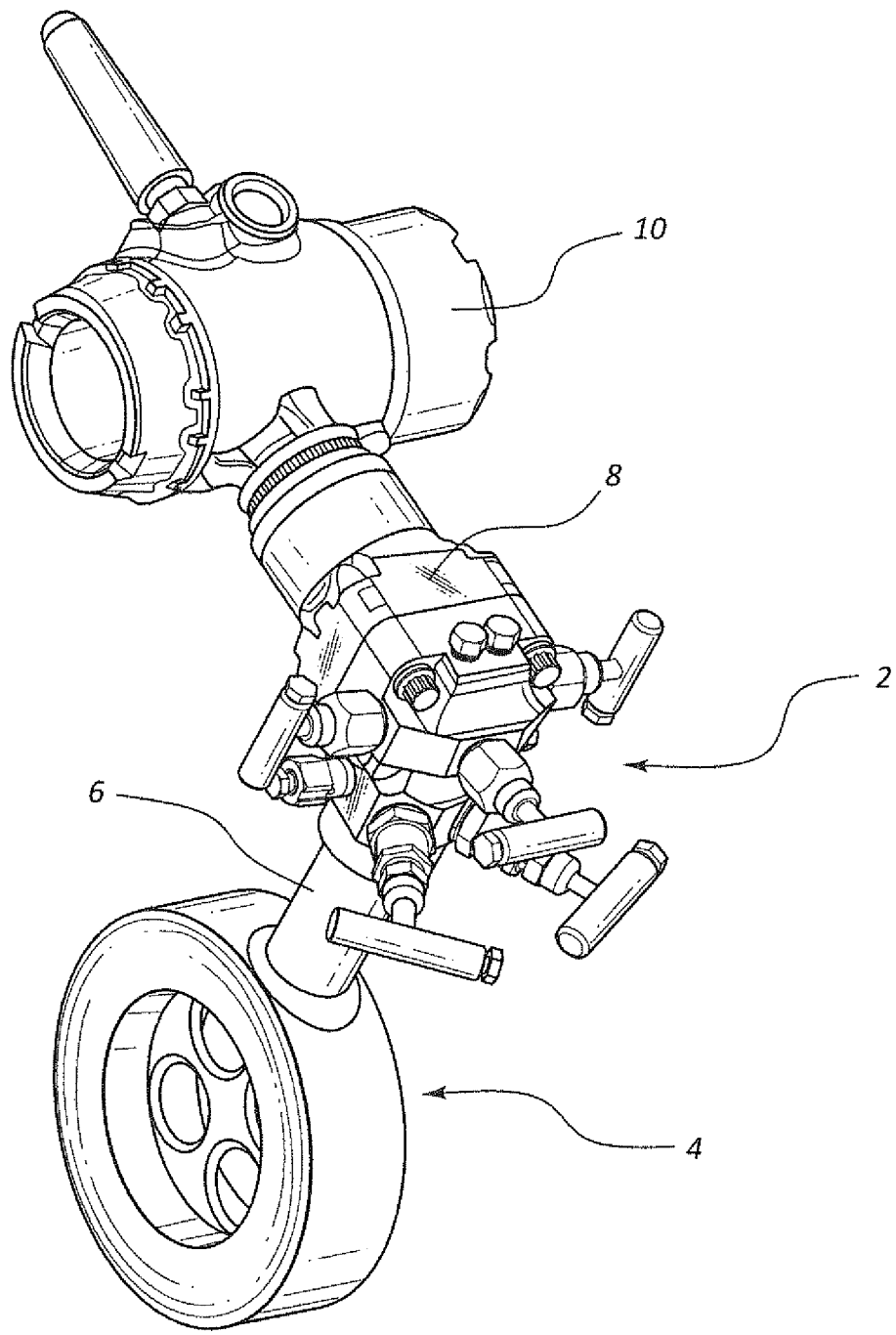
FIG. 1 is a perspective view of an exemplary primary flow element, in the form of an averaging orifice plate, and the related assembly components including the valve manifold of the present invention, the pressure transducer and the data transmitter.
Figure 2:
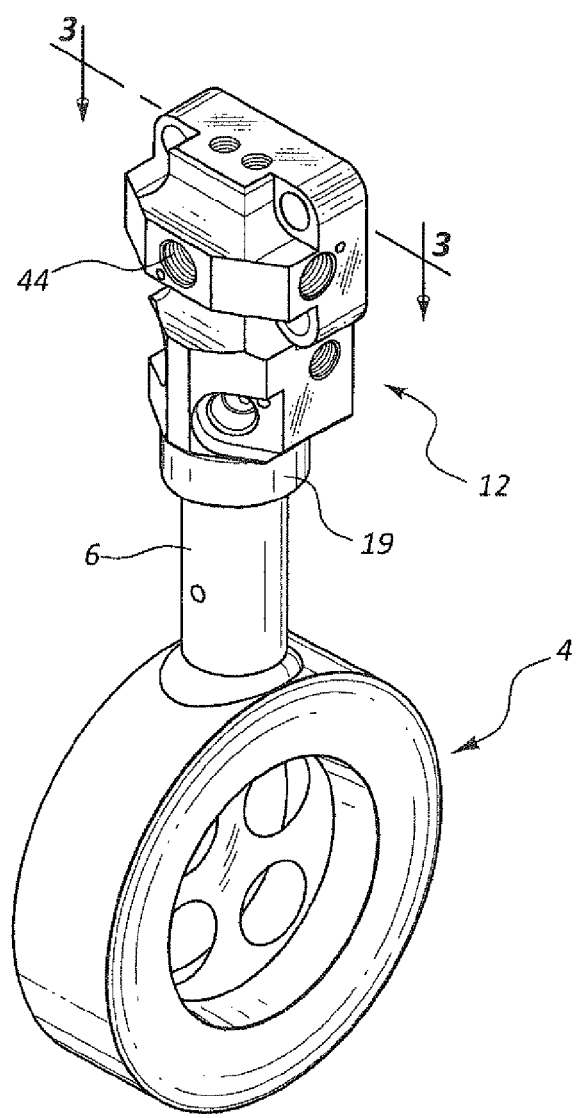
FIG. 2 is a perspective view of the body of the manifold valve of the present invention interconnected by an elongated neck to an averaging orifice plate primary flow element.
Figure 3:
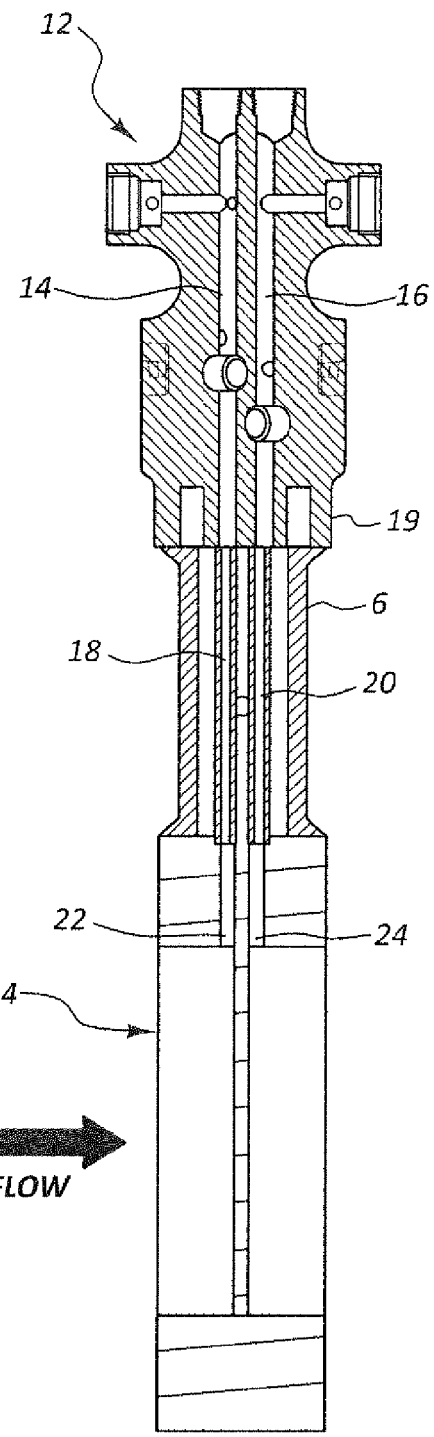
FIG. 3 is a cross sectional view taken along lines 3-3 in FIG. 2.
Figure 5:
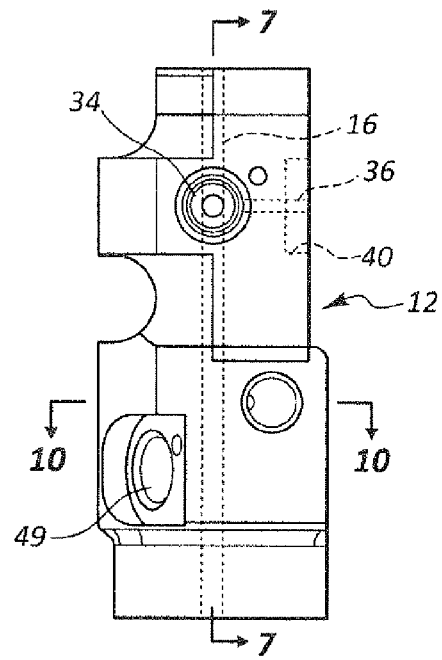
FIG. 5 is a side view of the body of the valve manifold.
Figure 6:
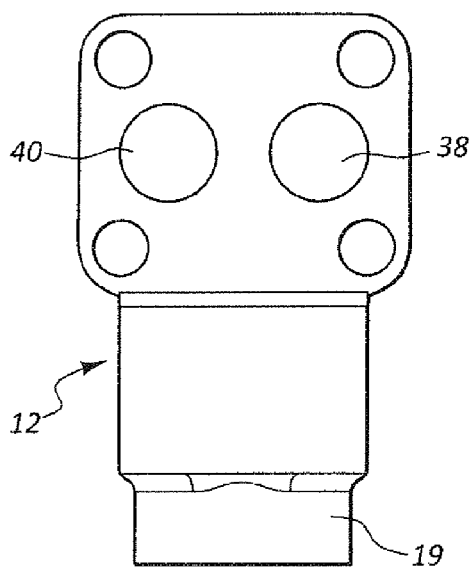
FIG. 6 is a rear view of the body of the valve manifold.
Figure 7:
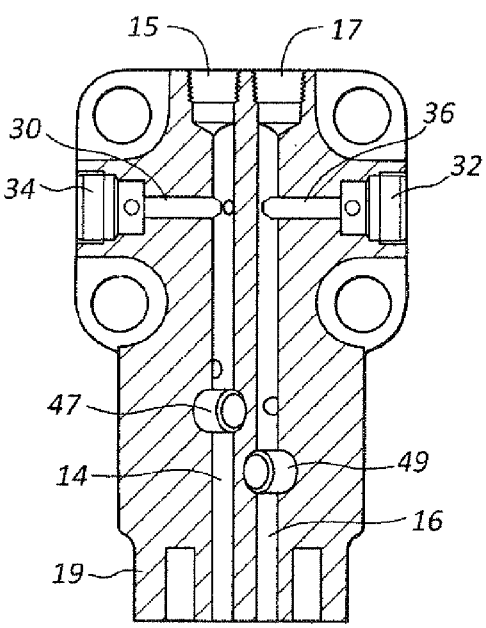
FIG. 7 is a cross sectional view of the body of the valve manifold taken along lines 7-7 of FIG. 5.

The valve manifold 2 of the present invention is shown in FIG. 1 as part of the primary flow element assembly, comprising a differential pressure primary flow element 4, an interconnecting neck 6, a pressure transducer 8 and the data transmitter 10. The body 12 of the manifold valve 2, without the associated valves, is shown in FIGS. 2 and 3 as being connected to a differential pressure averaging orifice plate primary flow element 4, which is described in U.S. Pat. No. 7,406,880. As shown in FIGS. 5 and 7, the manifold body 12 contains interior parallel and spaced apart high and low pressure process fluid bores 14 and 16 which traverse the length of the body and the lower body collar 19 and interconnect at their distal ends with conduits 18 and 20 disposed interiorly of the tubular mounting neck 6 that is secured to the cylindrical collar 19 at the bottom of the body 12. The top or proximal ends of the high and low pressure process fluid bores 14 and 16 terminate in receptacles 15 and 17 that accept threaded plugs to seal the ends of the bores during normal operation of the flow measuring assembly. The lower or distal ends of the conduits 18 and 20 are welded or otherwise connected to the high and low pressure ports 22 and 24 of the averaging orifice plate flow meter 4.

Figure 4:
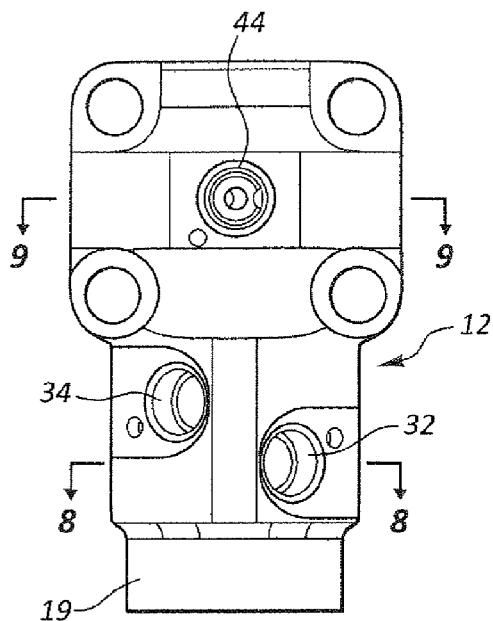
FIG. 4 is a front view of the body of the valve manifold.

At the vertical level of the body 12, indicated by lines 9-9 in FIG. 4 and shown in FIG. 9*a*, a pair of redundant block valves 26 and 28 is disposed on the respective lateral sides of the body 12. As seen in FIG. 9, the block valve pockets 30 and 32 intercept conduit paths 34 and 36 that provide a process fluid path from the vertical bores 14 and 16 to the high and low pressure transducer connection ports 38 and 40.

At the same level as valves 26 and 28 and disposed in the front side of the body 12 is an equalization valve 42 threadingly engaged in valve pocket 44. Cross bores 46 and 48 interconnect the valve pocket 44 with the respective process fluid conducting bores 14 and 16. Selective adjustment of the equalization valve will equalize the high and low process fluid pressure that is presented to the pressure transducer, thus allowing the transmitter to be calibrated.

Below the level of the redundant valves, and disposed in threaded valve pockets 47 and 49 located on the diagonal frontal faces of the manifold body 12, are through-port block valves 50 and 52. These valves are open during normal operation of the process flow and the open port feature of the valves allows flexible rods 50 and 51 to be inserted in the process fluid passages of the manifold and mounting neck for cleansing particulate matter therefrom during the rodding process. The rods should have sufficient length to pass through the bores 14 and 16 of the manifold and reach the neck conduits 18 and 20, the pressure ports 22 and 24 and portions of the apertured plate 55 of the primary flow element 4. The rodding process must be conducted when the process flow is shut down.

The primary function of the block valves 50 and 52 is to serve as the root shutoff system for the flow meter assembly. When the process flow involves flammable fluids it is of particular importance to provide a root shutoff device and such device should be fire-safe. Accordingly, the block valves 50 and 52 are preferably constructed as fire-safe valves in order to minimize dangerous product leakage and maintain effective shutoff when the valves are subject to fire conditions. Because there is no industry standard or test protocol for "fire-safe" valves, for purposes of this specification the term will mean that when a valve is exposed to fire conditions it will allow minimal leakage through the seat and stem and will continue to provide effective shutoff during or following a fire or exposure to excessive temperatures.

Figure 10:
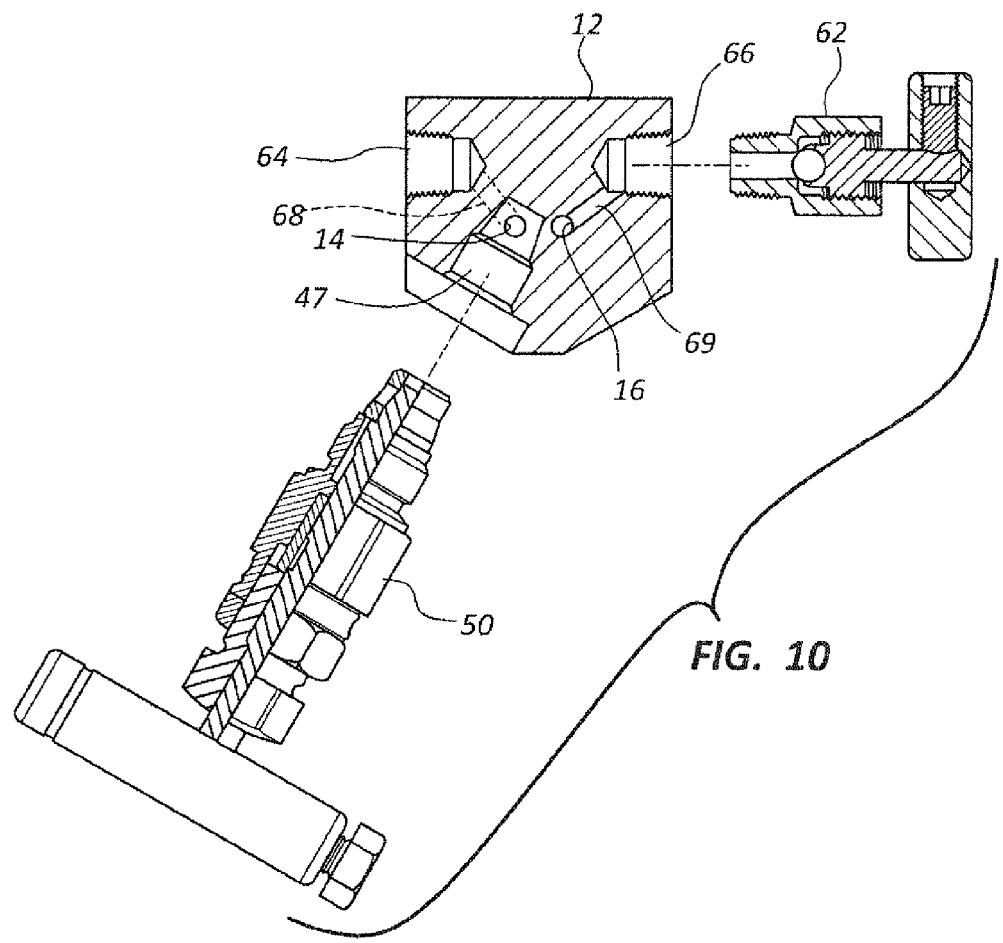
FIG. 10 is a cross sectional view of the body of the valve manifold taken along lines 10-10 of FIG. 4 and including exploded partial longitudinal cross sectional views of the valves that occupy of valve pockets also shown in FIG. 10.
Figure 11:
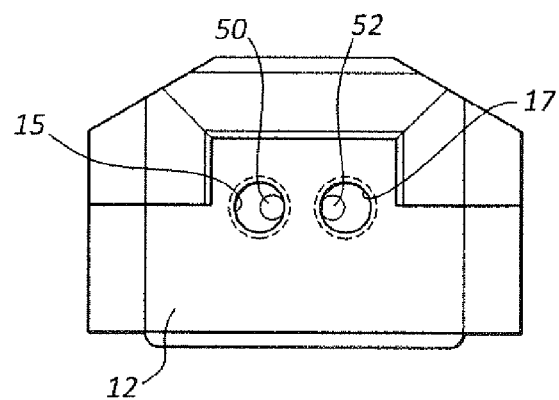
FIG. 11 is a top view of the body of the manifold valve.

During the rodding process when there is no process flow it is desirable to bleed trapped fluid from the manifold before commencing the rodding. For this purpose there is provided two bleed valves 60 and 62 that threadingly engage bleed valve pockets 64 and 66 disposed in the lateral sides of the manifold body 12 at a low vertical level. FIG. 10 illustrates the position of the valve pockets and the cross drilled bores 68 and 69 that interconnect the process fluid bores 14 and 16 with the respective valve pockets 64 and 66.

What is claimed is:

1. A roddable multi-valve manifold comprising,
a body having top and bottom surfaces, first and second lateral sides and front and rear aspects,
first and second fluid conducting roddable bores extending from the top surface to the bottom surface and including first and second pluggable ports located within the terminal ends of the bores at the top surface of the body,
first and second outlet passages intersecting the respective first and second fluid conducting bores and extending to the rear aspect of the body,
first and second pressure transducer ports disposed on the rear aspect of the body in communication with the respective first and second outlet passages,
first and second valves carried in the respective first and second lateral sides of the body for selectively blocking the fluid flow in the respective first and second outlet passages; and
first and second block valves having distal ends and carried by the front aspect of the body, each of said block valves having a through-port at its distal end where the through-port of each of said block valves is positioned within the respective first and second fluid conducting bores.

2. The manifold of claim 1 where the first and second block valves are fire-safe.

3. The manifold of claim 1 and further including,
first and second bleeder valves carried by the respective first and second lateral sides of the body in a position co-planar with the first and second block valves,
first and second bleeder bores interconnecting the respective first and second bleeder valves with the respective first and second fluid conducting bores.

4. The manifold of claim 3 and further including,
an equalizer valve carried by the front aspect of the body and positioned co-planar with the first and second valves,
first and second equalizer bores interconnecting the respective first and second fluid conducting bores and the equalizer valve.

5. The manifold of claim 4 and further including,
first and second port plugs disposed in the respective first and second pluggable ports on the top of the body.

6. The manifold of claim 4 and further including,
an elongated rigid neck member adapted to interconnect the bottom surface of the manifold body with a differential pressure primary fluid flow measuring element, said neck member having interiorly disposed first and second fluid conducting conduits that are interconnected with the respective first and second fluid conducting bores of the body.

7. A roddable multi-valve manifold comprising,
a body having top and bottom surfaces, first and second lateral sides and front and rear aspects,
first and second fluid conducting roddable bores extending from the top surface to the bottom surface and including first and second pluggable ports at the terminal ends of the bores at the top surface,
first and second outlet passages intersecting the respective first and second fluid conducting bores and extending to the rear aspect of the body, and
first and second pressure transducer ports disposed on the rear aspect of the body in communication with the respective first and second outlet passages,
first and second valve means carried in the respective first and second lateral sides of the body for selectively blocking the fluid flow in the respective first and second outlet passages, first and second block valves having distal ends carried by the front aspect of the body, each of said block valves having a through-port at its distal end and where the through-port of each of said block valves is positioned within the respective first and second fluid conducting bores, first and second bleeder valves carried by the respective first and second lateral sides of the body in a position co-planar with the first and second block valves, first and second bleeder bores interconnecting the respective first and second bleeder valves with the respective first and second fluid conducting bores, an equalizer valve carried by the front aspect of the body and positioned co-planar with the first and second valve means, and first and second equalizer bores interconnecting the respective first and second fluid conducting bores and the equalizer valve.

8. The Manifold of claim 7 and further including, an elongated rigid neck member adapted to interconnect the bottom surface of the body with a differential pressure primary fluid flow measuring element, said neck member having interiorly disposed first and second fluid conducting conduits that are interconnected with the respective first and second fluid conducting bores of the body.

9. The Manifold of claim 7 and further including, first and second port plugs disposed in the respective first and second ports on the top of the body.

10. A method for rodding the process fluid conducting channels of a valve manifold and mounting neck comprising the steps of, providing high and low pressure process fluid conducting channels through the longitudinal lengths of the body of a valve manifold and a mounting neck that interconnects the valve manifold with a differential pressure primary fluid flow measuring element in a fluid processing system, said fluid conducting channels having distal ends connected to the primary fluid flow measuring element and proximal ends which are adapted to be plugged, providing diversion channels in the body of the valve manifold laterally extending from and connected to the longitudinal process fluid conducting channels for conducting the respective high and low pressure process fluid to an external pressure transducer, shutting down the process fluid flow through the primary fluid flow measuring element, removing the plugs at the proximal ends of the longitudinal high and low pressure fluid conducting channels, and inserting cleaning rods into the fluid conducting channels and abrasively removing particulant matter from the sides of the channels and portions of the primary fluid flow measuring element.

11. The method of claim 10 and further including, providing double block through-port valves operable in the high and low pressure process fluid conducting channels;

opening the through-port block valves to permit passage of the cleaning rods.

\* \* \* \* \*